3,531,476
METHOD FOR THE PRODUCTION OF
PYRIDINE DERIVATIVES
Seiji Miyano and Akiko Abe, Fukuoka, Japan, assignors to Takeda Chemical Industries, Ltd., Osaka, Japan
No Drawing. Filed Mar. 28, 1967, Ser. No. 626,415
Claims priority, application Japan, Mar. 28, 1966, 41/19,510
Int. Cl. C07d 31/26, 31/28
U.S. Cl. 260—240   13 Claims

ABSTRACT OF THE DISCLOSURE

Compounds of the formula

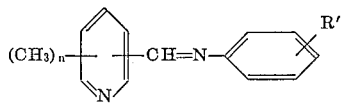

and pharmaceutically acceptable acid addition salts thereof, wherein
R' is H, lower alkyl, lower alkoxy or halogen atom,
n is 0 or 1, at least one $CH_3$ group being present on the pyridine ring when R' is H,
are non-narcotic and non-pyrazolone-type analgesics of low acute toxicity.

---

This invention relates to novel compounds having analgesic activity. More concretely stated, the invention is concerned with a series of pyridine derivatives having non-narcotic and non-pyrazolone-type analgesic activity and having low acute toxicity.

Hitherto, it has been a desideratum to provide analgesics having effective analgesic activity and being free from such defects as drug tolerance, drug eruptions and high acute toxicity.

The object of the present invention is to satisfy this desideratum and to provide novel pyridine derivatives useful as non-narcotic and non-pyrazolone-type analgesics.

The objective novel pyridine derivatives of the present invention are represented by the following formula:

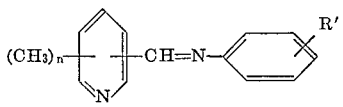

wherein R' is H, methyl, ethyl, methoxy or ethoxy, or a halogen atom (chlorine, bromine, iodine, fluorine), and n is 0 or 1, at least one $CH_3$ group being present on the pyridine ring when R' is H.

These new compounds show effective analgesia, and show substantially neither narcotic characteristics nor any of the side effects observed in pyrazolone-type analgesics. Moreover, the new compounds show low acute toxicity.

The present compounds (I) are prepared by allowing a compound of the formula

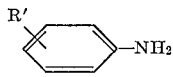

wherein R' has the same meaning as above, to react with a compound of the formula

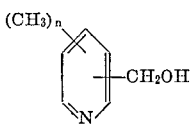

wherein n has the same meaning as above, in the presence of an oxidizing agent. The reaction equation is as follows:

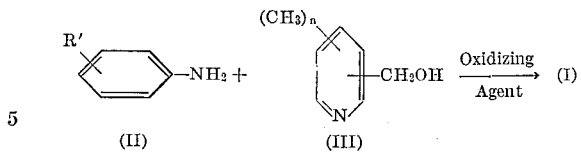

wherein R' and n have the same meaning as above.

The oxidizing agents employable in the present invention are exemplified by aromatic nitro compounds such as nitrobenzene, nitrotoluene, etc. and by aromatic tertiary amine N-oxides such as pyridine N-oxide, quinoline N-oxide, etc.

The present reaction is preferably carried out by adding such an oxidizing agent as above to a mixture of the two reactants under heating in an organic solvent such as benzene, toluene, xylene, etc.

The amount of the oxidizing agent used is optimally about equimolar with respect to the compound of the Formula III.

The reaction is accelerated by the presence of an alkaline substance, such as sodium hydroxide, potassium hydroxide, etc.

It is considered that the pyridine methanol (III) is first oxidized to give the corresponding pyridine aldehyde which, in turn, reacts with the amine (II).

Thus produced compounds of Formula I are exemplified as follows:

N-(2-pyridylmethylene)-p-methylphenylamine;
N-(2-pyridylmethylene)-p-methoxyphenylamine;
N-(2-pyridylmethylene)-p-ethoxyphenylamine;
N-(2-pyridylmethylene)-o-methylphenylamine;
N-(2-pyridylmethylene)-o-methoxyphenylamine;
N-(2-pyridylmethylene)-m-methylphenylamine;
N-(2-pyridylmethylene)-o-ethoxyphenylamine;
N-(2-pyridylmethylene)-o-chlorophenylamine;
N-(2-pyridylmethylene)-p-chlorophenylamine;
N-(4-pyridylmethylene)-p-methylphenylamine;
N-(6-methyl-2-pyridylmethylene)-p-methoxyphenylamine;
N-(6-methyl-2-pyridylmethylene)-o-methylphenylamine;
N-(6-methyl-2-pyridylmethylene)-p-methylphenylamine;
N-(6-methyl-2-pyridylmethylene)-o-methoxyphenylamine;
N-(6-methyl-2-pyridylmethylene-o-ethoxyphenylamine;
N-(6-methyl-2-pyridylmethylene)-p - ethoxyphenylamine;
etc.

When compounds I, as such or in the form of their aforesaid salts, are used as analgesics, a daily dose of about 50 to about 2000 milligrams, generally about 100 to about 1500 milligrams for a human adult, is advisable.

The compounds I, as such or in the form of their aforesaid salts, can be administered solely, or in combination with a pharmaceutically acceptable carrier, or can be administered together with other analgesics, with or without any other pharmaceutically acceptable carrier, the compounds being in any case administered as powder, tablets, solutions, emulsions, etc. for oral administration, or as injections, etc. for non-oral administrations.

The choice of carriers is determined by the preferred route of administration, the solubility of the compounds and standard pharmaceutical practice.

The following examples are solely for the purpose of illustration and are not to be construed as limitations of this invention, minor variations being possible without departing from the spirit or scope of this inventon.

The relationship between parts by weight and parts by volume is the same as that between milliliters and grams.

EXAMPLE 1

To a mixture of 12.8 parts by weight of p-methylphenylamine, 10.9 parts by weight of 2-pyridinemethanol, 70 parts by volume of xylene and 1.0 part by weight of sodium hydroxide, there is added dropwise 12.3 parts by weight of nitrobenzene in 15 minutes under heating at 150° C. After water is eliminated from the reaction mixture by the use of a water-separator, the mixture is refluxed for 2 hours under constant stirring. The volume of eliminated water is 3.4 parts.

After cooling the mixture, precipitating inorganic substances are dissolved by the addition of water. Then the separated xylene layer is extracted with dilute hydrochloric acid, followed by neutralization with an aqueous solution of potassium carbonate.

Thus-treated solution is extracted with ether. The ether layer is separated and dried over anhydrous sodium sulfate, and then the solvent is removed under reduced pressure.

The residue is subjected to distillation under reduced pressure to collect a fraction having a boiling range of 152–155° C./6 mm. Hg.

Purification of the said fraction by recrystallization with ethanol gives 15.0 parts by weight of N-(2-pyridylmethylene)-p-methylphenylamine as pale-yellow crystals melting at 58.9–59.0° C. Yield 76.5%.

*Elementary analysis.*—Calculated (percent): C, 79.56; H, 6.16; N, 14.28. Found (percent): C, 79.69; H, 6.24; N, 14.33.

When pyridine N-oxide or quinoline N-oxide is used in place of nitrobenzene, substantially the same result is obtained.

EXAMPLE 2

In place of p-methylphenylamine in Example 1, p-methoxyphenylamine, p-ethoxyphenylamine, o-methylphenylamine o-methoxyphenylamine, m-methylphenylamine, o-ethoxyphenylamine, o-chlorophenylamine and p-chlorophenylamine are employed to give N-(2-pyridylmethylene)-p-methoxyphenylamine (B.P.: 179° C./5 mm. Hg, M.P.: 40° C.), N-(2-pyridylmethylene)-p-ethoxyphenylamine (B.P.: 174–178° C./7 mm. Hg, M.P.; 58.9–59.0° C.), N-(2-pyridylmethylene)-o-methylphenylamine (B.P.: 140–144° C./6 mm. Hg, M.P.: 26.5–27.0° C.), N-(2-pyridylmethylene)-o-methoxyphenylamine (B.P.: 162–175° C./5 mm. Hg.), N-(2-pyridylmethylene)-m-methylphenylamine (B.P.: 157–158° C./6 mm. Hg, M.P.: 47° C.), N-(2-pyridylmethylene)-o-ethoxyphenylamine (B.P.: 160–164° C./6 mm. Hg), N-)2-pyridylmethylene)-chlorophenylamine (B.P.: 157–162° C./7 mm. Hg) and N-(2-pyridylmethylene)-p-chlorophenylamine (B.P.: 167–172° C./7 mm. Hg. M.P.: 65–66° C.), respectively.

EXAMPLE 3

To a mixture of 10.7 parts by weight of p-methylphenylamine, 5.5 parts by weight of 4-pyridinemethanol, 50 parts by volume of xylene and 1.5 parts by weight of sodium hydroxide, there is added dropwise 6.2 parts by weight of nitrobenzene in 10 minutes under heating at 150° C. After 1.5 parts by volume of water is eliminated from the mixture by the use of a water-separator, the mixture is refluxed for one hour under constant stirring.

After cooling the mixture, precipitating inorganic substances are dissolved by the addition of water. Then the separated xylene layer is extracted with dilute hydrochloric acid, followed by neutralization with potassium carbonate.

Thus-treated solution is extracted with ether. The ether layer is separated and dried over anhydrous sodium sulfate, and then the solvent is removed under reduced pressure. The residue is subjected to distillation under reduced pressure to collect a fraction having a boiling range of 160–169° C./6 mm. Hg.

Purification of the fraction by recrystallization with ethanol gives 3.6 parts by weight of N-(4-pyridylmethlene)-p-methylphenylamine as pale-yellow crystals which melt at 99.5° C. Yield 36.0%.

*Elementary analysis.*—Calculated for $C_{13}H_{12}N_2$ (percent): C, 79.56; H, 6.17; N, 14.27. Found (percent): C, 79.31; H, 6.04; N, 14.24.

When nitrotoluene is used in place of nitrobenzene, substantially the same result is obtained.

EXAMPLE 4

To a mixture of 36.9 parts by weight of p-methoxyphenylamine, 24.6 parts by weight of 6-methyl-2-pyridinemethanol, 10 parts by volume of xylene and 2 parts by weight of potassium hydroxide, there is added dropwise 24.6 parts by weight of nitrobenzene in 15 minutes under heating at 150° C. After 6.1 parts by volume of water is eliminated from the reaction mixture by the use of a water-separator, the mixture is refluxed for one hour under constant stirring.

After cooling the residue, water is added to dissolve precipitated inorganic substances. Then the separated xylene layer is extracted with dilute hydrochloric acid, followed by neutralization with potassium carbonate.

Thus-treated solution is extracted with ether. The separated ether layer is dried over anhydrous sodium sulfate and the solvent removed under reduced pressure. The residue is subjected to distillation under reduced pressure to collect a fraction having a boiling range of 187–192° C./7 mm. Hg.

Said fraction is subjected to cooling to precipitate crystals which are then recrystallized with ligroin to yield 35.0 parts by weght of N-(6-methyl-2-pyridylmethylene)-p-methoxyphenylamine as pale-yellow crystals melting at 48° C.

*Elementary analysis.*—Calculated for $C_{14}H_{14}N_2O$ (percent) C, 74.31; H, 6.24; N, 12.38. Found (percent) C, 74.69; H, 6.03; N, 12.02.

EXAMPLE 5

In place of p-methoxyphenylamine in Example 4, o-methylphenylamine, p-methylphenylamine, o-methoxyphenylamine, o-ethoxyphenylamine, and p-ethoxyphenylamine are employed to give N-(6-methyl-2-pyridylmethylene)-o-methylphenylamine (B.P.: 56–161° C./7 mm. Hg. M.P.: 39° C.), N-(6-methyl-2-pyridymethylene)-p-methylphenylamine (B.P.: 150–160° C./7 mm. Hg, M.P.: 68° C.), N-(6-methyl-2-pyridylmethylene)o-methoxyphenylamine (B.P.: 175–177° C./7 mm. Hg), N-(6-methyl-2-pyridylmethylene)-o-ethoxyphenylamine (B.P.: 153–157° C./3 mm. Hg, M.P.: 83–85° C.) and N-(6-methyl-2-pyridylmethylene)-p-ethoxyphenylamine (B.P.: 188–194° C./7 mm. Hg, M.P.: 75° C.), respectively.

Compounds I form pharmaceutically acceptable acid addition salts with various organic and inorganic acids. Examples are the hydrochlorides, hydrogen sulfates, phosphates, hydrobromides, citrates, tartrates, benzenesulfonates, succinates, etc. The said salts possess the same analgesic activity as the corresponding free compounds but in some cases are of enhanced solubility.

That is claimed is:

1. A member selected from the group consisting of compounds of the formula

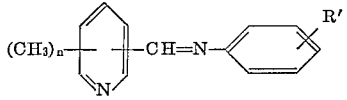

and pharmaceutically acceptable acid addition salts thereof, wherein R' is alkoxy with 1 to 2 carbon atoms, or a halogen atom and n is 0 or 1.

2. A compound according to claim 1, namely, N-(2-pyridylmethylene)-p-methoxphenylamine.

3. A compound according to claim 1, namely, N-(2-pyridylmethylene)-p-ethoxyphenylamine.

4. A compound according to claim 1, namely, N-(2-pyridylmethylene)-o-methoxyphenylamine.

5. A compound according to claim 1, namely, N-(2-pyridylmethylene)-o-ethoxyphenylamine.

6. A compound according to claim 1, namely, N-(2-pyridylmethylene)-o-chlorophenylamine.

7. A compound according to claim 1, namely, N-(2-pyridylmethylene)-p-chlorophenylamine.

8. A compound according to claim 1, namely, N-(4-pyridylmethylene)-p-methylphenylamine.

9. A compound according to claim 1, namely, N-(6-methyl-2-pyridylmethylene)-p-methoxyphenylamine.

10. A compound according to claim 1, namely, N-(6-methyl-2-pyridylmethylene)-o-methoxyphenylamine.

11. A compound according to claim 1, namely, N-(6-methyl-2-pyridylmethylene)-o-ethoxyphenylamine.

12. A compound according to claim 1, namely, N-(6-methyl-2-pyridylmethylene)-p-ethoxyphenylamine.

13. A method for producing a compound of the formula

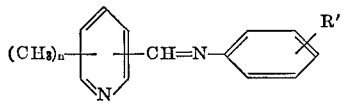

wherein R' is H, alkyl or alkoxy having 1 to 2 carbon atoms, or halogen, and $n$ is 0 or 1, at least one $CH_3$ group being present on the pyridine ring when R' is H, which comprises reacting a compound of the formula

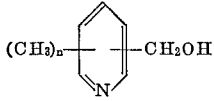

wherein R' has the same meaning as defined above, with a compound of the formula:

(CH₃)ₙ—⟨ring⟩—CH₂OH wherein $n$ has the same meaning as defined above, in the presence of oxiding agent selected from a member of the group consisting of nitrobenzene, nitrotoluene, pyridine N-oxide, and quinoline N-oxide.

References Cited

Harries et al.: Annalen der Chemie, vol. 410, p. 102 (1915).

Klingsberg: Pyridine and Derivatives, part 4, pp. 180, 182 to 183 and 192, Interscience Publishers (1964).

JOHN D. RANDOLPH, Primary Examiner

U.S. Cl. X.R.

260—999